United States Patent [19]
Moller

[11] Patent Number: 5,513,218
[45] Date of Patent: Apr. 30, 1996

[54] COMPENSATION FOR GROUND VOLTAGE VARIATION ON A COMMUNICATION BUS

[75] Inventor: David D. Moller, Kokomo, Ind.

[73] Assignee: Delco Electronics Corp., Kokomo, Ind.

[21] Appl. No.: 262,176

[22] Filed: Jun. 20, 1994

[51] Int. Cl.$^6$ .............................. H04B 3/00; H04L 25/00
[52] U.S. Cl. .............................. 375/257; 307/31; 375/295
[58] Field of Search ...................................... 375/257, 295, 375/296; 307/9.1, 12, 28, 31; 327/378, 379–382, 317, 331, 362; 326/29, 30, 31, 33

[56] References Cited

U.S. PATENT DOCUMENTS

| | | |
|---|---|---|
| 4,774,692 | 9/1988 | Oishi et al. ............................... 327/56 |
| 4,890,015 | 12/1989 | Wise .......................................... 326/22 |
| 5,432,817 | 6/1995 | Hormel et al. ........................... 375/257 |

*Primary Examiner*—Stephen Chin
*Assistant Examiner*—Hai H. Phan
*Attorney, Agent, or Firm*—Mark A. Navarre

[57] ABSTRACT

A serial communication bus for a motor vehicle subject to different ground voltages on the common line and a transmitting module has a compensation circuit to prevent mismatches which distort pulse current waveforms and cause radiated emissions. When line ground voltage is higher than the transmitter voltage an integrator is used to simulate the line ground voltage and apply that to the transmitter ground. The integrator has a small current source and a very large current sink to follow the line ground potential. The transmitter output is disabled between pulses to avoid increasing the line ground voltage. When line ground voltage is lower than the transmitter voltage, the transmitter is enabled between pulses to feed current to the line to increase its potential.

14 Claims, 2 Drawing Sheets

5,513,218

COMPENSATION FOR GROUND VOLTAGE VARIATION ON A COMMUNICATION BUS

FIELD OF THE INVENTION

This invention relates to a serial data bus serving modules of various ground potentials, and particularly to a method and apparatus for compensating for voltage variations which could give rise to electromagnetic emissions.

BACKGROUND OF THE INVENTION

To afford digital communication among electronic components in automotive vehicles a class 2 bus has been proposed. Such a bus would serve many disparate modules by carrying pulse width modulated signals over a common line comprising a single wire. While digital signals are commonly expressed by square wave pulses, the fast rise and fall times give rise to electromagnetic interference (EMI) which is especially undesirable in the class 2 system due to the opportunity to emit radiation from the extended line. To avoid such radiation each transmitter module filters or shapes the square wave data input pulses to assure that for the corresponding transmitted pulses the rise and fall times are slew rate limited and wave corners are rounded rather than sharp, thereby avoiding rapid changes of signal current.

The many vehicle components served by the bus have their own power supplies, and while grounding through the vehicle structure may maintain some degree of commonality, there remains a variance of ground voltages among the various modules. Since each module is coupled to the common line via resistive and capacitive impedance, they all affect the ground potential of the line itself. As a result, the line voltage may appear to a given module to be as much as 2 volts above or below the ground voltage of the module. If then, a carefully shaped voltage pulse is applied to the line at a much different ground voltage, the pulse current will be distorted to include rapid current changes, especially at the inception of the pulse, to cause EMI.

SUMMARY OF THE INVENTION

It is therefore an object of the invention to transmit pulses without significant distortion on a serial bus subject to voltage variations. Another object is to compensate for voltages differences on a serial bus to avoid radiation emissions.

The basic transmitting circuit of a module comprises a waveshaping circuit which receives square wave data input pulses and filters them to yield pulses having sloped rise and fall times and rounded corners, and an output circuit comprising a high side voltage follower. Thus for each square wave input there will be a pulse output to a common line, the pulse being shaped to minimize radiated emissions.

The general approach to transmitting pulses on a data line while maintaining the wave shape for minimizing EMI, is to equalize the ground voltage of the transmitting module and the ground voltage of the line. The line is connected through impedances to other modules which together establish its ground potential, that is, the potential it assumes in the absence of applied data pulses. If the line is lower in ground voltage than the module, sufficient current can be applied by the module to the line to increase its voltage to about the level of the module voltage. This occurs between data pulses so that as each pulse is applied the line will be conditioned to receive the pulse without distortion. On the other hand, if the line is higher in ground voltage than the module, the module voltage can be increased to substantially match the line ground voltage; this is achieved by simulating the line ground voltage and applying the simulated voltage to the ground of the waveshaping circuit in the module.

A circuit for simulating the common line ground voltage and applying that voltage to the module features an integrator having its input connected to the common line. In order to respond to the ground voltage rather than to the pulses imposed on the line by the module, the integrator is configured with a current source of small capacity and a current sink capacity at least an order of magnitude greater than the source. This minimizes the output voltage increase between transmitted bits and allows the integrator to rapidly discharge to the lower levels of the common line waveform. The integrator output then is close to the common line ground voltage and is connected to the ground of the waveshaping circuit to equalize the ground of the module and the line. To prevent a gradual increase in the integrator output due to feedback to the input via the output circuit, the output circuit is disabled between pulses, thereby allowing the line to decay to its nominal DC level. A comparator detects when a pulse is high and supplies an enabling signal to the output circuit, but when the pulse decays to a low voltage the enabling signal is removed.

When the common line has a low ground voltage, it is desirable to continue enabling the output circuit between pulses to supply current for increasing the line voltage to the ground level of the module. For this purpose, a second comparator determines when the line ground voltage, as simulated by the integrator, is lower than a threshold value; then another enabling signal is produced by the second comparator and applied to the output circuit. An OR gate receives the data input pulse, and the outputs of both comparators and produces the output enable signal. When the second comparator yields an output signal, the OR gate is activated to continuously enable the output circuit.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
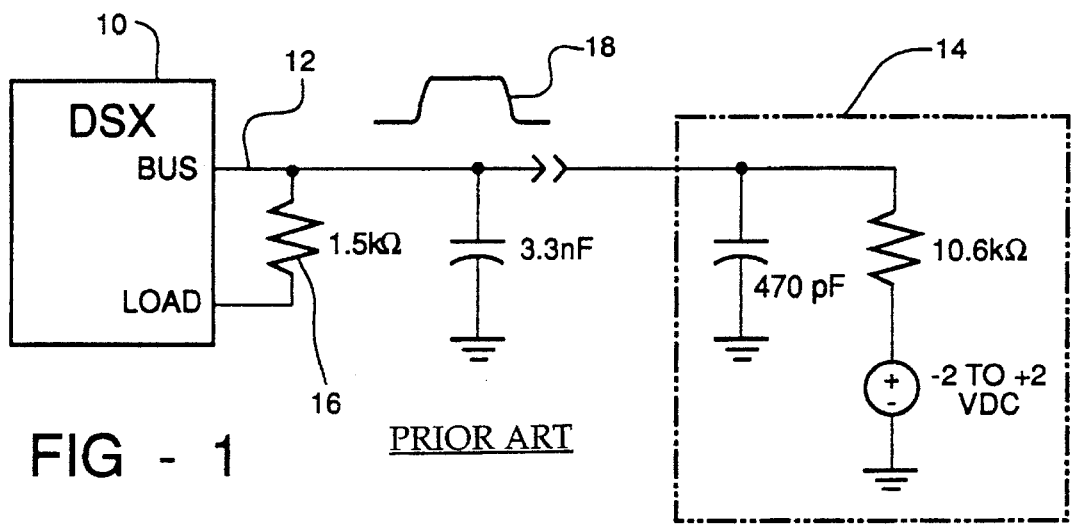
FIG. 1 is a schematic diagram of a class 2 bus according to the prior art.

Referring to FIG. 1, a class 2 bus is illustrated as a dual serial transceiver 10 coupled by a common line 12 to as many as 32 remote modules 14, each terminated with a 470 pF capacitor and a 10.6 kohm resistor. The local unit 10 includes a load resistor 16 of 1.5 kohms connecting the line to ground. The remote units may also be transceivers or perhaps receivers only. In any event the transceiver outputs are high side only drivers, with the external resistors pulling the bus down to their local grounds. In the aggregate the remote units are equivalent to a capacitance of 20 nF between the bus and ground and a resistance of 330 ohms. coupled to ground through an offset voltage between +2 and −2 volts. The transceiver 10 must maintain waveshaping over that range of potentials. The desired waveshaped pulse 18 is shown above the line 12.

Figure 2:
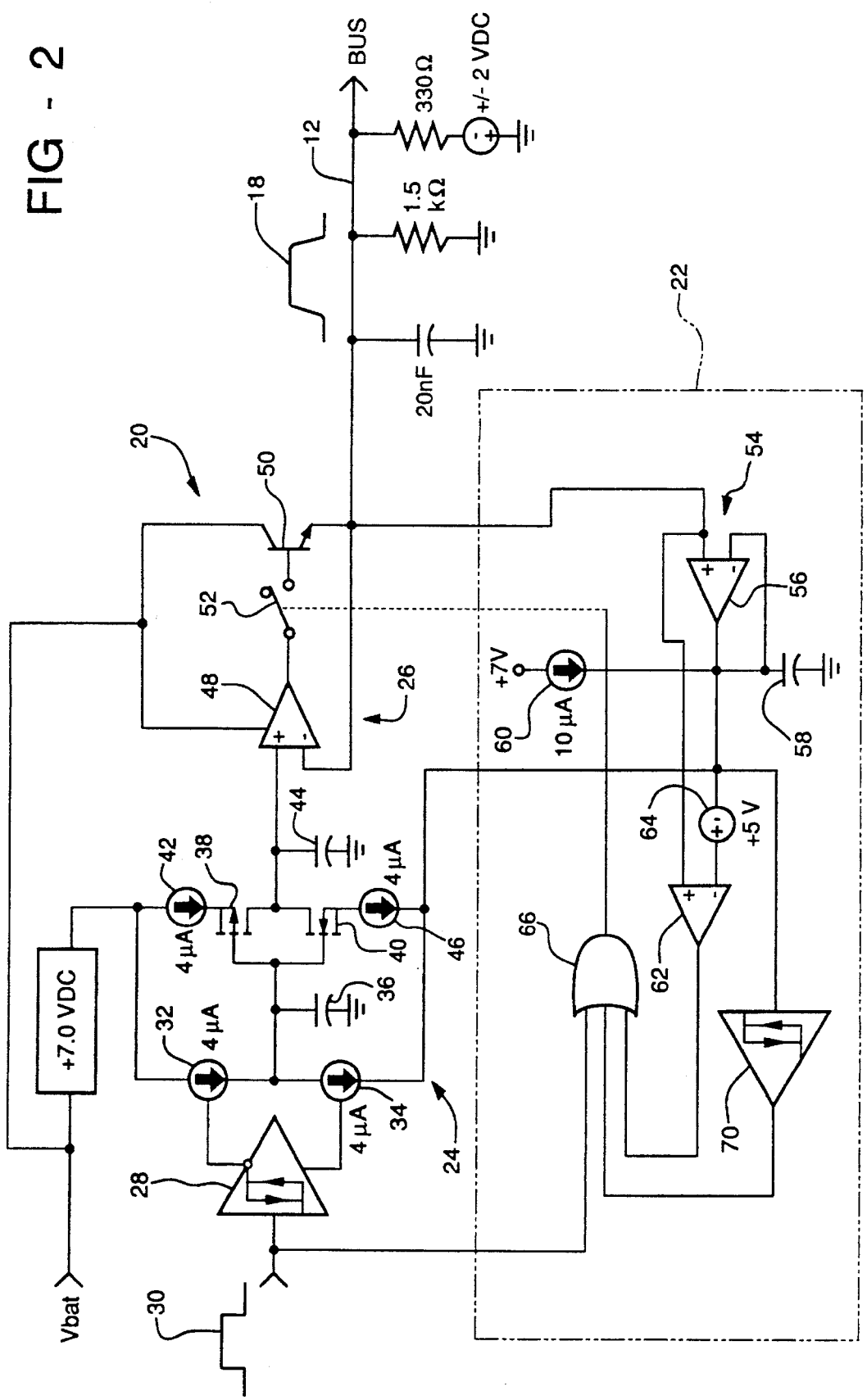
FIG. 2 is a schematic diagram of a class 2 bus with voltage equalization according to the invention.

The basic pulse transmitting circuit 20 is shown in FIG. 2 along with compensation circuitry 22 to equalize line and local module ground voltages. The transmitter circuit 20 comprises a waveshaping circuit 24 and a high side follower circuit 26, supplied by battery voltage and a regulated 7 volts DC supply. The waveshaping circuit 24 has a comparator 28 with hysteresis as the input element and receives a square wave data pulse 30. The comparator is set to switch to one state when its input goes above 2 volts and to switch to the other state when the input goes below 0.8 volt. An inverted comparator output is coupled to a 4 μA current source 32 and a non-inverted input is coupled to a 4 μA current sink 34 so that those elements 32 and 34 conduct alternately according to the state of the input signal. The current source 32 and sink 34 are serially coupled between the 7 volt supply and ground. Their junction is connected to one side of a 20 pF capacitor 36, the other side being grounded. The junction is also connected to the gates of MOSFETs 38 and 40. The FET 38 is a P-channel device, its source connected via a 4 μA current source 42 to the 7 volt supply and its drain connected to the source of FET 40 as well as to one side of a 20 pF capacitor 44. The FET 40 is an N-channel device and its drain is coupled through a 4 μA current sink 46 to the local ground. The other side of capacitor 44 is grounded. The capacitor 44 voltage is the output of the waveshaping circuit.

In operation, a logic 1 value of the input pulse 30 causes the comparator 28 to switch on the current sink 34 and switch off the current source 32 to discharge the capacitor 36 at a slew rate determined by the sink capacity and the capacitor 36 value. When the state of the input pulse 30 and the comparator 28 change, the current source conducts to charge the capacitor at the same slew rate and the sink 34 is turned off. When the capacitor 36 voltage goes low the FET 38 conducts to effect charging of capacitor 44, and conversely, higher voltage on capacitor 36 effects FET 40 conduction to discharge the capacitor 44. The overall result is a two-stage filtering which establishes fixed slew rates for rising and falling pulse edges and rounded corners at the transition points of edges and horizontal portions of the wave shape.

The output circuit 26 is a high side follower implemented by a unity gain amplifier 48 which drives the base of a transistor 50 coupled between the battery voltage and the common line 12. A switch 52, controlled by the compensating circuit, is inserted between the amplifier 48 and the transistor 50 for selectively disabling or enabling the output circuit. The output pulse 18 on the line 12 has the shape determined by the waveshaping circuit 24, provided that there is no mismatch of ground voltages of the common line 12 and the transmitter circuit 20.

The compensation circuit 22 assures that there will be no mismatch of the ground voltages. To correct for the condition of the common line 12 having a higher potential than the transmitter circuit 20, an integrator 54 produces an output voltage which simulates the ground voltage of the common line 12. The integrator 54 comprises an operational amplifier 56 having its positive input coupled to the line 12, and the negative input and the output connected to the high side of a large capacitor 58 (e.g. 0.1 μF), the low side being grounded. The integrator has an internal current sink, not shown, rated at 500 μA, to quickly discharge the capacitor 58 to the line ground voltage when it occurs between the pulses 18 on the line. A relatively small (10 μA) current source 60 (shown as external but may be internal of the integrator) connected between the 7 volt supply and the integrator output allows a slow increase in capacitor 58 voltage. The 50 to 1 ratio of current sink to source capacities strongly biases the integrator toward the ground potential of the line 12 and is relatively insensitive to the pulses on the line. The integrator 54 output is connected to the ground of the waveshaping circuit 24, assuring equality with the line 12 ground.

Figure 3:
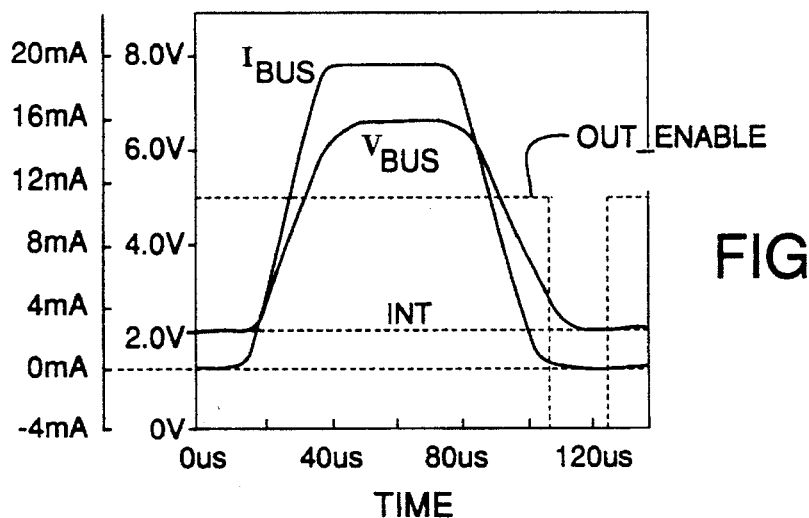
FIGS. 3 and 4 are waveform diagrams illustrating the operation of the bus according to the invention.
Figure 4:
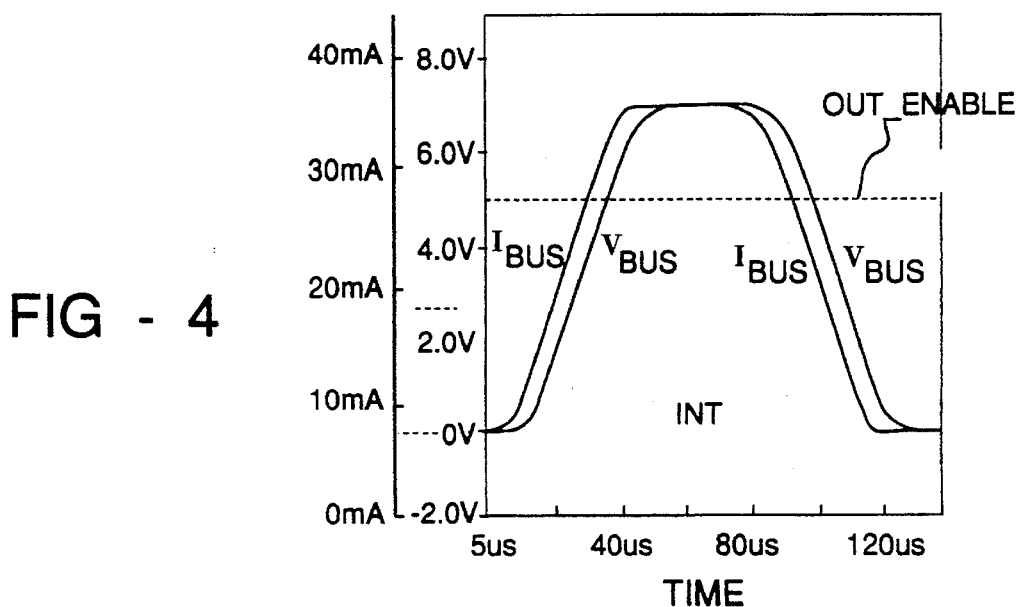

Since there is a feedback from the integrator output to the input via the output circuit 20, there is a tendency for the integrator to slowly increase the ground voltage. This is prevented by disabling the output circuit between pulses so that the line 12 may seek its actual level. A comparator 62 has its positive input connected to the line 12 and its negative input connected via a +0.5 volt offset 64 to the integrator output. The comparator 62 output is an input of an OR gate 66 which enables the output circuit by closing the switch 52. Another input of the OR gate is the input pulse 30. For each input pulse the switch 52 is closed at the beginning of each input pulse and is held closed by the comparator as long as the output pulse 18 remains at least 0.5 volt above the simulated ground. At that point, the comparator 62 turns off and the output circuit 20 is disabled. The waveforms of FIG. 3 illustrate this condition for the case of a line ground potential of +2 volts, labelled as INT for the integrator level. The input pulse 30 begins at time 0 and shortly afterward the output current $I_{BUS}$ and voltage $V_{BUS}$ to the bus begin. The input pulse enables the output circuit and the bus voltage is sufficient to maintain the output enabled until it falls to 2.5 volts. Then the out_enable signal terminates, the switch 52 opens, and the line 12 decays to its natural ground voltage. At the time the switch 52 opens the pulse current has already substantially reached zero and no current discontinuity occurs. Thus the waveshaped output pulse is successfully transmitted without a distortion which would cause unacceptable radiated emissions.

Where the common line 12 has lower ground potential than the transmitter 20, current is supplied between pulses to the line through the output circuit to raise the potential. A comparator 70 with hysteresis has its input coupled to the integrator 54 output, and turns on for voltages below 0.2 volts and turns off above 0.4 volts. The comparator 70 output comprises another input to the OR gate 66 to maintain the enable signal to the output circuit when the low ground potential is detected. Essentially, for the low ground potential case the out-enable signal is always on as shown by the waveforms of FIG. 4. There it is shown that even though the natural ground potential of the bus is −2 volts, the output driver is sourcing sufficient current into the bus between input pulses to maintain a zero ground potential and to thus maintain the waveshaping of the output pulses.

It will thus be seen that the compensation method and apparatus is effective to assure low radiated emissions by maintaining the waveshaping of transmitted pulses by equalizing the bus and transmitter ground voltages. This is accomplished with simple circuitry and when implemented by an integrated circuit it requires only a small amount of space on the chip.

The embodiments of the invention in which an exclusive property or privilege is claimed are defined as follows:

1. In a serial communication system having a common line carrying data pulses among a plurality of communication modules, wherein the ground voltage of a module may be different from the common line ground voltage, a transmitting module comprising:

waveshaping means having a module ground voltage, and being operative to generate data pulses shaped to minimize electromagnetic emissions;

an output circuit for coupling data pulses from the waveshaping means to the common line; and compensation means for equalizing the module ground voltage and the common line ground voltage by applying common line ground voltage to the module ground voltage, and by feeding current to the common line between successive data pulses of said waveshaping means when the common line ground voltage is low relative to the module ground voltage.

2. The transmitting module as defined in claim 1 wherein the compensation means includes an integrator circuit having its input coupled to the common line for producing an output voltage substantially equal to the common line ground voltage, the integrator output being coupled to the module ground voltage, thereby elevating the module ground voltage when the module ground voltage is below the common line ground voltage.

3. The transmitting module as defined in claim 2 wherein the integrator has a small source current to limit its response to pulses on the common line and a sink current at least an order of magnitude greater than the source current.

4. The transmitting module as defined in claim 2 including means for allowing the common line voltage to subside to its ground voltage between pulses from the waveshaping means.

5. The transmitting module as defined in claim 2 including means for disabling the output circuit when the voltage of a data pulse declines to a threshold value above the common line ground voltage for allowing the common line voltage to subside to its ground voltage between data pulses generated by the waveshaping means.

6. The transmitting module as defined in claim 2 including:
a comparator responsive to the common line voltage and a value just above the common line ground voltage; and
means coupled to the comparator for disabling the output circuit when the voltage of a data pulse falls below said value, thereby releasing the common line voltage to return to the common line ground voltage.

7. The transmitting module as defined in claim 2 including:
an input of the waveshaping means for receiving input pulses;
a comparator means for producing an output when a data pulse on the common line is more than a set voltage above the common line ground voltage; and
an OR gate having a first input for receiving the input pulses and a second input for receiving the comparator output to produce an enabling signal for enabling the output circuit when an input pulse or a comparator output is present, whereby the enabling signal is removed when an input pulse has terminated and the data pulse on the common line is below the set voltage.

8. The transmitting module as defined in claim 2 wherein the compensation means includes means effective when the integrator output is less than a reference value for enabling the output circuit between successive data pulses of said waveshaping means to thereby feed current to the common line for increasing the common line ground voltage when the common line ground voltage is low relative to the module ground voltage.

9. The transmitting module as defined in claim 8 wherein the means for enabling the output circuit includes a comparator having as inputs a reference value and the integrator output.

10. The transmitting module as defined in claim 7 wherein the compensation means includes a second comparator means for producing an output when the integrator output is less than a reference value, and the output of the second comparator means is coupled to an input of the OR gate to enable the output circuit to feed current to the common line.

11. In a serial communication system having a common line carrying data pulses among a plurality of communication modules, wherein the ground voltage of a module may be different from the common line ground voltage, and wherein a transmitting module includes a waveshaping circuit having a module ground voltage, and being operative to generate data pulses and an output circuit for coupling pulses from the waveshaping means to the common line, a method of equalizing the module ground voltage and the common line ground voltage comprising the steps of:
producing a simulated ground voltage equivalent to the common line ground voltage;
applying the simulated ground voltage to the module ground voltage; and
feeding current to the common line to increase the common line ground voltage when the simulated ground voltage is below a set reference value.

12. The method of equalizing ground voltages as defined in claim 11 wherein producing a simulated ground voltage comprises integrating the common line voltage and biasing the integrated value toward the common line ground voltage.

13. The method of equalizing ground voltages as defined in claim 12 including limiting the effect of the integrated value on the common line ground voltage by disabling the output circuit when a data pulse decays to a low value.

14. The method of equalizing ground voltages as defined in claim 11 wherein the step of feeding current to the common line comprises enabling the output circuit between successive data pulses of said waveshaping means.

* * * * *